Nov. 8, 1932.  E. L. LE ROY  1,887,414
SHEET GLASS DRAWING APPARATUS
Filed Dec. 27, 1930    4 Sheets-Sheet 2
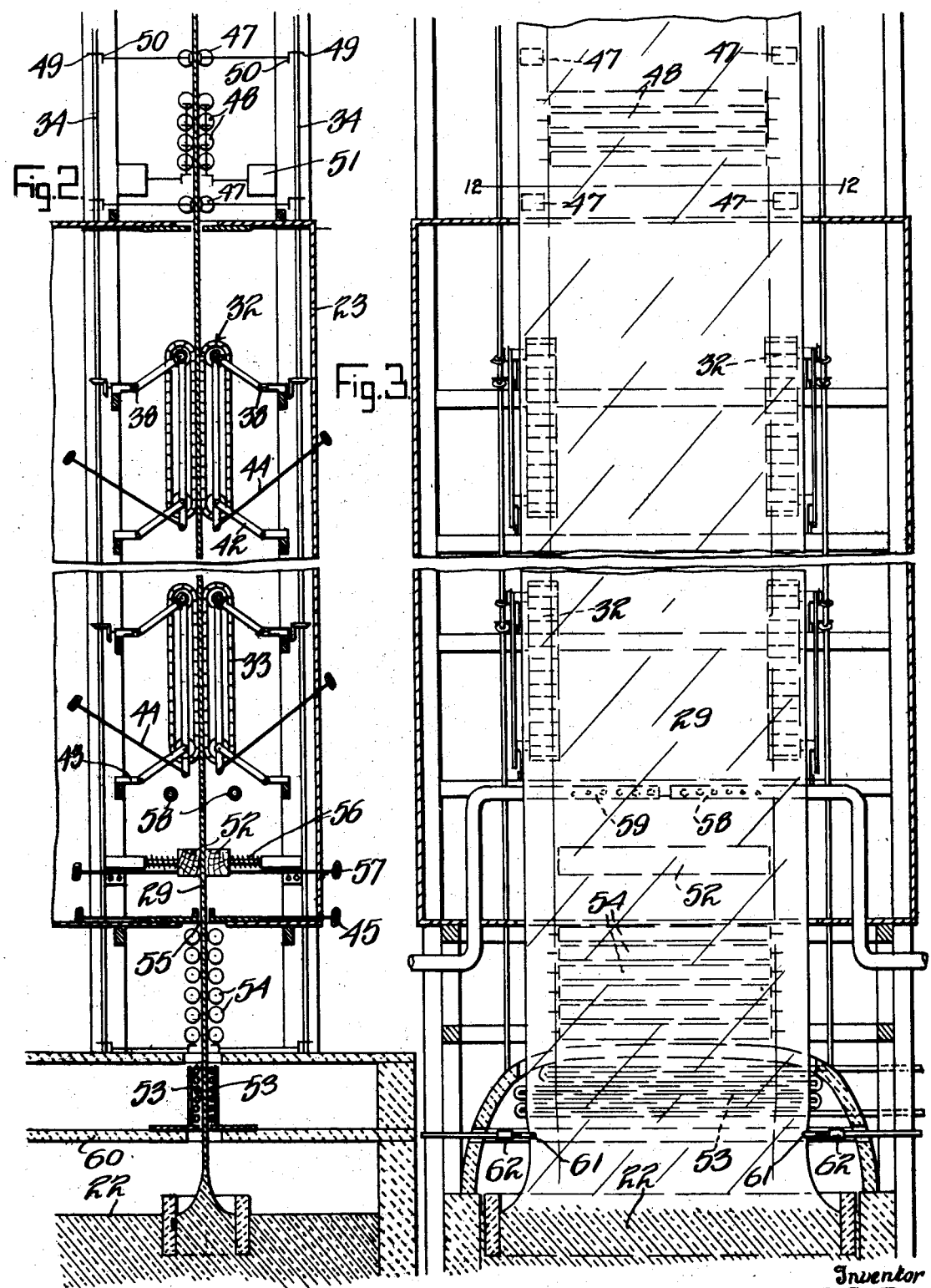
Inventor
Edmond L. LeRoy

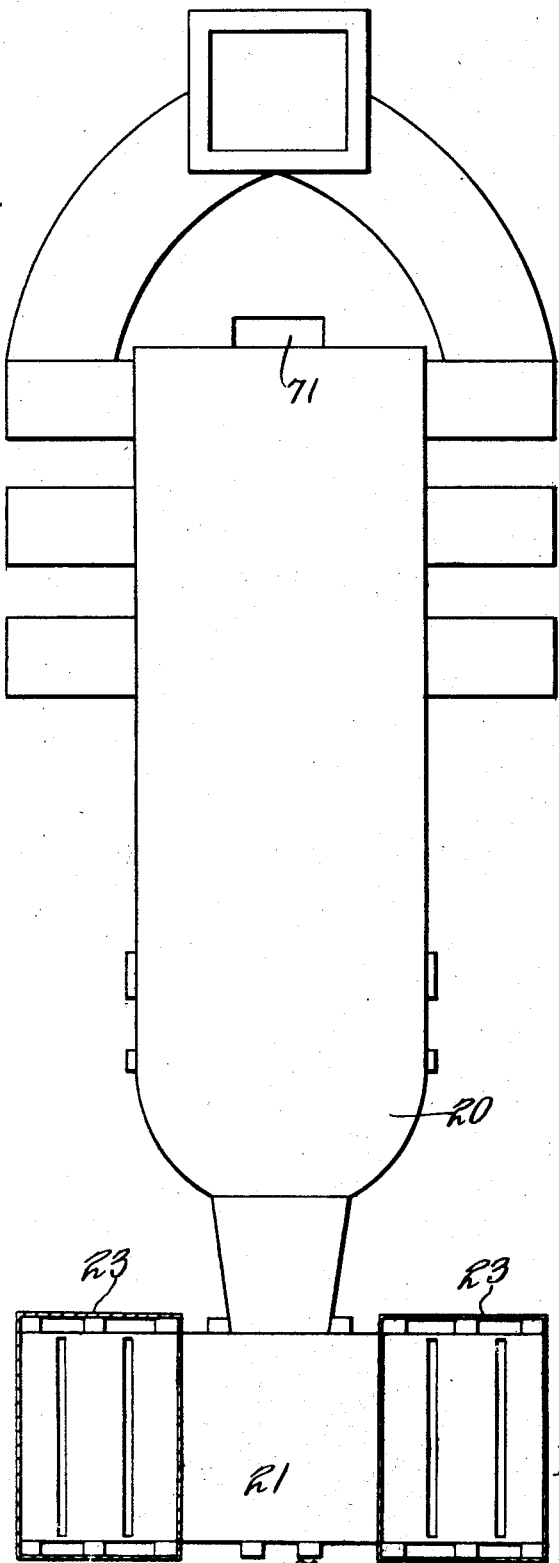

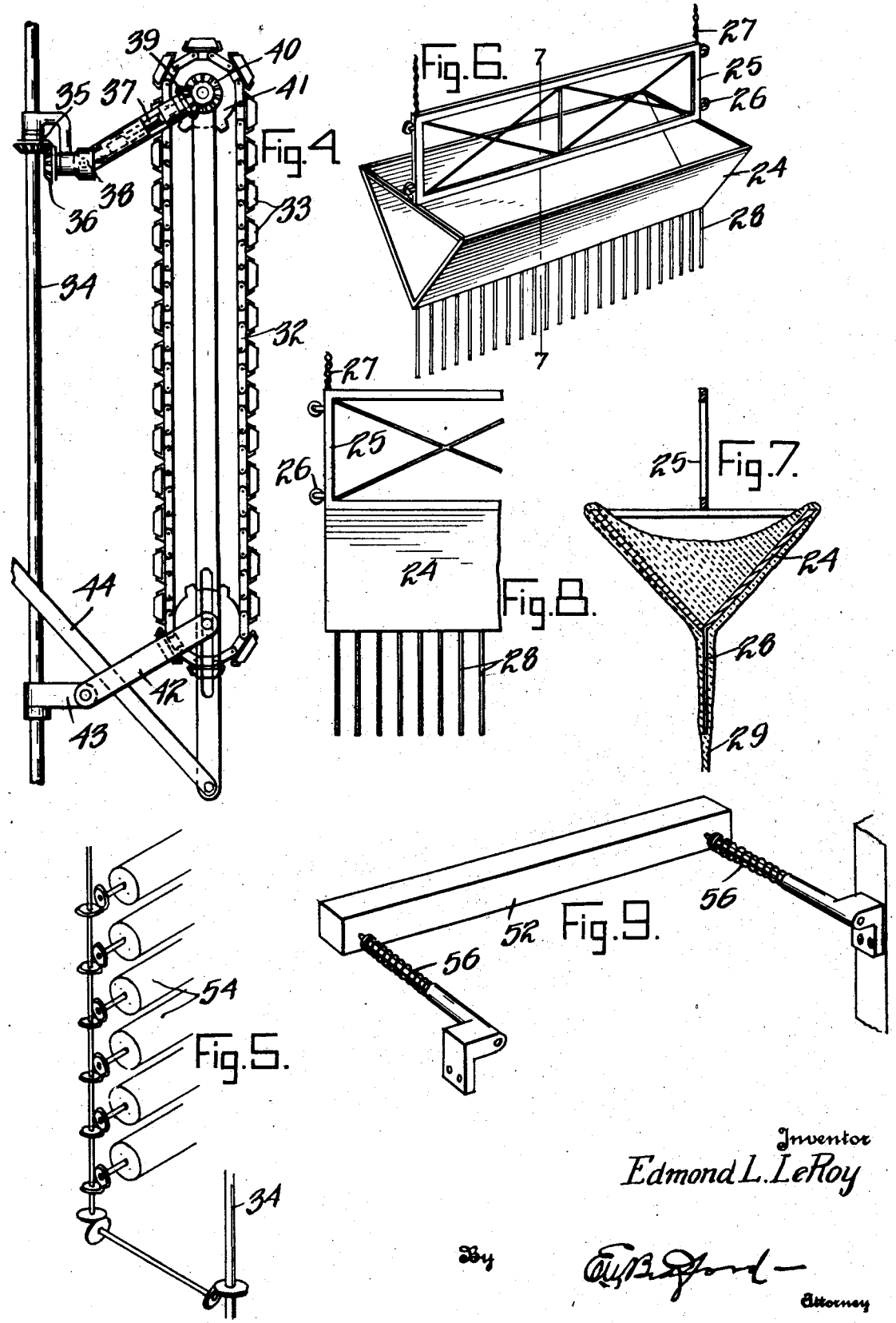

Nov. 8, 1932.  E. L. LE ROY  1,887,414
SHEET GLASS DRAWING APPARATUS
Filed Dec. 27, 1930  4 Sheets-Sheet 4
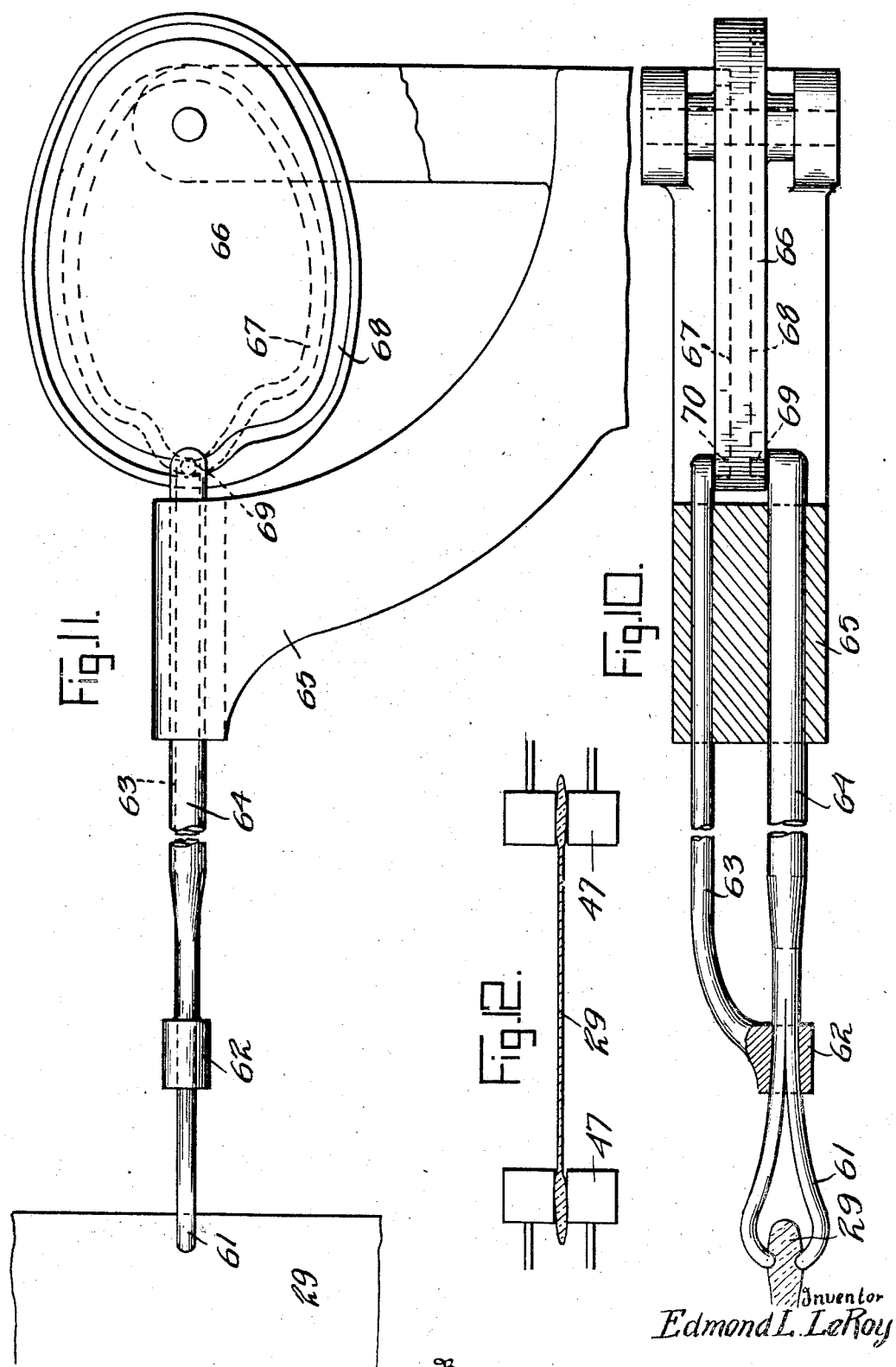
Inventor
Edmond L. LeRoy
By
Attorney Patented Nov. 8, 1932

1,887,414

UNITED STATES PATENT OFFICE

EDMOND L. LE ROY, OF BRIDGETON, NEW JERSEY

SHEET GLASS DRAWING APPARATUS

Application filed December 27, 1930. Serial No. 505,164.

This invention relates to glass making apparatus and particularly to means for drawing glass into sheet form.

An object of the invention is to provide a machine which will make glass much cheaper than has been possible with machines heretofore in use and in which flaws and defects in the glass will be avoided.

A further object is to provide a machine in which there will be less loss through defective glass than with machines heretofore in use.

A further object is to provide a machine in which errors in operation due to the human element may be avoided.

Other objects and advantages will become apparent as the description proceeds.

Referring to the accompanying drawings which are made a part hereof and on which similar reference characters indicate similar parts, Figure 1 is a plan view showng a glass melting furnace with a portion of the drawing machine shown in section, Figure 2, a side elevation partly in section of the drawing machinery, Figure 3, a front elevation of the drawing machinery, Figure 4, a detail view of one of the caterpillar conveyors, Figure 5, a detail view showing a group of cooling rollers, Figure 6 is a detail showing the bait for pulling the sheet of glass out of a mass of molten glass, Figure 7, a section on line 7—7 of Figure 6, Figure 8, a detail view of a portion of the bait, Figure 9, a detail view of one of the friction blocks engageable with a side of the glass, Figures 10 and 11 are detail views showing means for laterally pulling the sheet of glass, and Figure 12 is a section on line 12—12 of Figure 3.

In the drawings numeral 20 indicates a melting furnace in which the materials out of which the glass is made are deposited and heated to form the molten glass. In forming the composition out of which the glass is made I preferably use silica sand, carbon, pulverized limestone, oyster shell, salt cake, arsenic and soda ash. In a batch containing 4000 pounds there will be approximately 2120 pounds silica sand, 20 pounds carbon, 380 pounds lime stone, 380 pounds oyster shells, 460 pounds salt cake, 200 pounds of arsenic and 440 pounds soda ash. This material is thoroughly mixed two or three times and then is put into the melting furnace. The raw material just described hereinafter will be called a batch. The furnace is heated to approximately 2600° F. The batch is then placed in the melting furnace and with each shovel full of batch there is added a shovel full of cullet which consists of broken glass.

The molten mass of glass in the chamber 20 flows into a vat or reservoir 21 in which its temperature is materially lowered to approximately 950° F. The temperature, however, may be controlled to suit conditions and to make glass of different thickness.

The level of the glass in the reservoir 21 will be maintained at an appropriate constant point such as 22. Upon the reservoir 21 at each end are mounted annealing chambers 23, in which chambers may be two or more glass drawing or pulling devices. These devices are all alike and therefore only one will be described. It should be understood, however, that the operating mechanism for each one is separate so that they may travel at different speeds to make glass of different thickness or for any other reason. The sheet of glass is originally started by what is termed a bait and which is shown in detail in Figures 6, 7 and 8. This bait consists of a trough 24, preferably V-shaped, suspended beneath a frame 25. Rollers 26 are secured at the outer ends of the frame engageable in suitable guideways or tracks, the bait being pulled up by means of chains 27 in any suitable way. The bait is used only to start the sheet of glass in its upward travel, after which it is broken loose or detached from the sheet of glass and the sheet continues to travel independently, without further assistance of the bait. As shown in Figure 8, from the lower ridge of the V-shaped bait is suspended a number of small spaced apart rods 28. During operation the glass which adheres to the sides of the bait runs down toward the lower edge and is held from running close together by means of these rods. Unless these rods are used the glass would tend to become very thin at the bottom of the bait and be easily broken off. In Figures 2 and 3 the sheet of glass 29 is shown fully formed and in position in which it travels continuously vertically up through the annealing chamber and out into the chamber 30 above the floor 31 in which chamber the glass is cut into suitable lengths by apparatus not shown and forming no part of the present invention.

The sheet of glass is conveyed upwardly by a plurality of caterpillar conveyors 32 which have friction material such as asbestos 33 forming a shoe for engagement with the edges of the sheets of glass. The conveyors are driven from a shaft 34 having beveled gears 35 meshing with corresponding beveled gears 36 which drive a shaft 37. In order to permit vertical adjustment or movement of the conveyors the shaft 37 is provided with a universal joint 38. A bevel gear 39 meshing with bevel gear 40 on which the sprocket wheels 41 are mounted drives the conveyor. The conveyors are mounted on links 42 pivoted to brackets 43 on the frame of the machine so as to rest by gravity against the sheet of glass, one on each side of the sheet of glass. The conveyors are lifted away from the sheet of glass by links 44. This is necessary when the glass is first started. In case one set of conveyors need repairing or need to have the asbestos shoes renewed it may be lifted up while another set of conveyors continues to move the glass.

Any number of groups of tractors or conveyors may be provided depending on the height of the annealing chamber. Tractors may be positioned some distance apart depending somewhat on the length of the portion of the conveyor which contacts with the sheet of glass. Positioned outside of the annealing chamber are two sets of short resilient rollers 47 which are driven from the shaft 34 through bevel gears 49 and 50. Positioned adjacent the guiding conveying rollers 47 are a number of burnishing or polishing rollers 48. These rollers are driven at a very high speed and may be driven separately from the shaft 34 as by means of an electric motor 51, any suitable driving connection being provided between the motor and the rollers. The polishing rollers 48 remove the soot and other coating placed upon the sheet of glass by means of blocks 52 positioned in the lower portion of the annealing chamber. Positioned just above the reservoir of molten material are cooling coils 53 positioned on opposite sides of the sheet of glass through which coils cold water is circulated. These coils are positioned very close to the sheet of glass but do not contact with the glass. As the glass emerges from the mass of molten material it is very hot and considerable heat is conveyed away by this first cooling means. Instead of the cold water coils any other suitable cooling means may be employed. Positioned somewhat above the first cooling means are a number of rollers 54 driven from the shaft 34 which likewise do not contact with the sheet of glass but which are positioned so that their peripheries come in very close proximity to the glass. These rollers may be of any suitable material such for example as clay or any other good heat conducting material. These rollers assist in cooling down the sheet of glass before it enters the annealing chamber 23. A slot is provided in the bottom of the annealing chamber at 55, which slot has adjusting means 45 in order to regulate the space between the sides of the slot and the surface of the glass as the glass should not contact with any foreign material at this stage in its travel upwardly. Positioned within the annealing chamber is a pair of blocks 52 which are resiliently held against the sheet of glass by means of springs 56. The blocks may be moved back against the tension of the spring by means of a lever 57. It is, of course, necessary to move them back during the upward transfer of the bait at the start of the operation of the machine. The blocks 52 are preferably of wood and are held tightly against the sheet of glass as it moves vertically. At this period of its travel the glass is very hot and tends to burn and char the contacting surface of the wooden blocks. The result is that a deposit of soot is left upon the surface of the glass. Just above the friction blocks 52 is positioned a pair of burners 58, these burners are connected with a source of fuel such as gas or oil rich in carbon. The burners 58 have perforations 59 of progressively increasing size and fuel issuing through these perforations is projected against the sheet of glass. This oil is burned as it contacts with the glass and assists further in burning the soot deposited upon the sheet of glass so that a film of burned soot is left upon the sheet of glass. Positioned within the reservoir just beneath the cover 60 is provided means for stretching the sheet of glass as it emerges from the surface of the molten material. This means is shown in detail in Figures 10 and 11. It consists of opposed pairs of grippers 61 which are normally biased to open but which are pressed into closed positions to grip the edge of the sheet of glass by means of a sleeve 62 mounted on the inner end of an arm 63. The grippers themselves are mounted upon an inner end of a shaft 64 which is slidably held in a bracket 65. The arm 63 being likewise mounted in the bracket 65 and permitted an axial movement through the bracket. A cam 66 is rotatably mounted upon the frame of the machine and has cam grooves 67 and 68 on opposite sides. Rollers 69 and 70 are provided on the ends of the shafts 63 and 64 respectively, these rollers engaging in the cam grooves 67 and 68 whereby rotation of the cam will move the shafts 63 and 64 longitudinally. The grooves in the cam are so provided as to operate so as to move the gripper 61 in position where the jaws engage over the edge of the sheet of glass. The cam groove then moves the sleeve 62 forward to cause the grippers to engage with the sheet of glass. The grooves then are so positioned that rods 64 and 63 move back together to pull laterally on the sheet of glass to stretch it. This movement is about one-fourth of an inch or less, after which the cam groove 67 causes the rod 63 to move to the rear faster to release the grippers after which the shaft 64 is withdrawn from engagement with the sheet of glass and then the cam grooves both act to withdraw both of the shafts 63 and 64 to the rear withdrawing them away from the chamber 21. The purpose of this pulling device is to pull out any corrugations that may be in the sheet of glass as it is pulled up from the surface of the molten mass of glass.

The operation of the machine is as follows: A batch of material such as that described is put in the melting chamber and heated approximately to 2600° F. at which temperature it is reduced to a fluid mass after which it runs into the chamber 21. Material is continuously applied to the chamber 20 through the opening 71. The temperature is maintained substantially constant in the chamber 20 so that the molten mass of glass in this chamber is substantially of uniform consistency. When the glass is of the right temperature and of right fluid consistency the bait 24 is lowered into the body of the molten glass. In order to do this, cooling devices 53 and 54, the gate 45, blocks 52, the conveyors 32 and 47 and the burnishing rollers 48 are all withdrawn so that the bait may pass down between them and be pulled up between them with its load consisting of a sheet of glass. As the bait moves upward through the coolers 53 these are moved in close to, but do not contact with the glass, likewise the coolers 54, blocks 52 and the conveyors 32 and 47 are moved into their operating positions as soon as the bait is moved out of the way. As soon as the bait reaches the chamber above the floor 31 it is detached from the sheet of glass which is being moved forward by the power driven conveyors 32 and rollers 47. As the sheet moves up, it first has heat carried off by means of the fluid cooling coils 53. The temperature of the sheet is materially reduced by this cooling unit, however, as it passes between the sets of rollers 54 its temperature is further reduced, as it passes into the lower side of the annealing chamber 23. Soon after entering this chamber it passes between and in contact with wooden blocks 52. The temperature of the glass is still very high and it burns the contacting surfaces of these blocks so as to char the blocks and leave a deposit of soot on the glass. This soot is further burned and mixed with a coating of soot resulting from burning oil or gas issuing from the burners 58. The conveyors 32 grip only the edge of the sheet of glass on both sides as they convey the glass upwardly. These conveyors therefore do not destroy or injure in any way the sheet of glass except along a very narrow edge. This edge is later sheared off so that no portion of the finished glass product comes into engagement with any conveying apparatus. Since it is necessary to use large quantities of cullet in melting up the batch, this glass which is sheared off is not wasted but is needed for the cullet.

As the sheet travels out of the annealing chamber its temperature has become materially lowered. It is further driven and guided by rollers 47. These rollers are preferably of resilient material such as rubber and do not injure the glass at all. The glass moreover is then carried up between the polishing rollers 48 which remove the soot and carbon film deposited by the burners in the lower end of the annealing chamber. The sheet of glass moreover is guided by the upper rollers 47 through a slit in the floor 31 which is the floor to the cutting off chamber or room positioned above. Suitable machinery is provided for cutting off the sheets of glass in any desirable lengths and storing them in any way, such apparatus forming no part of the present invention.

From the description given it should be apparent that at no time does any part of the machine come in contact with the sheet of glass so as to injure the sheet of glass until the glass has become finally finished and polished preparatory to being cut off in its finished state. This insures that the surface of the glass will be absolutely free from defects or flaws of any kind.

In machines of usual size the sheet of glass will travel approximately 60 inches to the minute which of course means that a sheet of glass of full width five feet long is made every minute. As contrasted with other devices the speed with which glass may be made by my machine should be very apparent. With a given temperature of the molten mass of glass in the reservoir 21 and with a given speed the sheets of glass will of course have a uniform thickness at all times. By changing the speed of the machine the thickness of the glass may be increased or decreased at will. Increased speed, of course, reduces the thickness of the glass. Glass of several different thicknesses of course may be made by the one system within each of the annealing chambers. As here shown there are two conveyors each of which may be driven at a different speed so glass of one or more different thicknesses may be made at the same operation. As here shown glass of four different thicknesses may be in the process of being made at the same time. By increasing or decreasing the speed of any one of the conveyors glass of any desired thickness may be made. Of course experience will determine what speed is required to produce glass of a given thickness.

Since conveyors or caterpillars are in groups if the shoes on one of these becomes worn they may be replaced without stopping the machine as the other caterpillars will continue to convey the material while the shoe is removed and a new shoe is inserted on the conveyor.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. In a glass making machine having means for pulling glass vertically out of a mass of molten glass, a plurality of wooden blocks resiliently held against the side of the glass to coat the glass with soot, and a plurality of rollers positioned to engage said glass to polish off the soot deposited by the said blocks, said rollers being driven at a relatively high rate of speed, substantially as set forth.

2. In a glass making machine having means for pulling glass vertically out of a mass of molten glass, a plurality of wooden blocks resiliently held against the side of the glass to coat the glass with soot, a plurality of rollers positioned to engage said glass to polish off the soot deposited by the said blocks, said rollers being driven at a relatively high rate of speed, and additional means for burning the soot and further coating the glass with a carbon film, substantially as set forth.

3. In a glass making machine having a body of molten glass, means for pulling a sheet of glass vertically from the surface of the molten glass, and cooling means comprising a plurality of coils positioned adjacent the sheet of glass slightly above the mass of glass, said coils comprising tubes of metal of high heat conductivity, substantially as set forth.

4. In a glass making machine having a body of molten glass, means for pulling a sheet of glass vertically from the surface of the molten glass, cooling means comprising a plurality of coils positioned adjacent the sheet of glass slightly above the mass of glass, said coils comprising tubes of metal of high heat conductivity, and additional means placed adjacent the coils to further cool the glass, substantially as set forth.

5. In a glass making machine having a body of molten glass, means for pulling a sheet of glass vertically from the surface of the molten glass, cooling means comprising a plurality of coils positioned adjacent the sheet of glass slightly above the mass of glass, said coils comprising tubes of metal of high heat conductivity, and additional means placed adjacent the coils to further cool the glass, said additional means consisting of a plurality of clay rollers positioned adjacent the sheet of glass, substantially as set forth.

6. A glass sheet making machine comprising a vat of molten glass, a V-shaped bait movable into and out of the vat of glass, said bait having a plurality of metal hangers along its lower edge, said hangers serving to prevent the glass from becoming too thin at the edge of the bait, means engageable with the glass for conveying it after the bait has released its grip on the glass, said means engaging the edge of the glass only, and means engageable with the edge of the glass while it is still in a plastic state for stretching it laterally to eliminate corrugations, substantially as set forth.

7. A glass sheet making machine comprising a vat of molten glass, a V-shaped bait movable into and out of the vat of glass, said bait having a plurality of metal hangers along its lower edge, said hangers serving to prevent the glass from becoming too thin at the edge of the bait, means engageable with the glass for conveying it after the bait has released its grip on the glass, said means engaging the edge of the glass only, means engageable with the edge of the glass while it is still in a plastic state for stretching it laterally, a plurality of blocks positioned opposite each other and resiliently held in engagement with the glass, the hot glass serving to char the blocks to deposit a coating of soot upon the sheet of glass, and a plurality of rollers operable at a high rate of speed positioned well above the said blocks for polishing off the soot deposited by the said blocks, substantially as set forth.

8. A glass sheet making machine comprising a vat of molten glass, a V-shaped bait movable into and out of the vat of glass, said bait having a plurality of metal hangers along its lower edge, said hangers serving to prevent the glass from becoming too thin at the edge of the bait, means engageable with the glass for conveying it after the bait has released its grip on the glass, said means engaging the edge of the glass only, means engageable with the edge of the glass while it is still in a plastic state for stretching it laterally, a plurality of blocks positioned opposite each other and resiliently held in engagement with the glass, the hot glass serving to char the blocks to deposit a coating of soot upon the sheet of glass, a plurality of rollers operable at a higher rate of speed positioned well above the said blocks for polishing off the soot deposited by the said blocks, and additional heating and smoking means adjacent said blocks for further coating the sheet of glass, substantially as set forth.

9. A sheet glass making machine comprising a container for molten glass and an annealing chamber positioned above the molten glass, means for conveying a strip of glass up through the annealing chamber, said means comprising conveyors positioned to grip the edge of the glass and move it upwardly, and a plurality of resilient rollers engageable with the edge of the glass to continue to convey it out of the annealing chamber and into a compartment in which the sheet will be separated from the vertically moving sheet of glass, substantially as set forth.

10. In a sheet glass drawing machine, a plurality of conveyors, a pair of friction blocks resiliently held against the sides of the sheet of glass, the heat of the glass acting to char and deposit a coating of soot on the glass, and a plurality of high speed rollers engageable with the sheet of glass to polish off the soot deposited by the charred blocks, whereby finished polished glass is produced at a single operation, substantially as set forth.

11. In a sheet glass drawing machine, a plurality of conveyors engageable with an edge of the glass, shoes on the conveyors, means whereby the shoes on one conveyor can be renewed without interfering with the operation of the machine, substantially as set forth.

12. A machine for continuously drawing sheets of glass of various thicknesses comprising a vat adapted to contain molten glass, a plurality of baits movable into the molten glass, means for moving the baits vertically at different speeds to pull sheets of glass of thicknesses dependent upon said speeds, up from the surface of the molten mass of glass, a single annealing chamber for the plurality of sheets of glass, and means engageable with the edges of the sheets of glass to move them vertically when the said baits have been released from the glass and a plurality of polishing means arranged above the annealing chamber, substantially as set forth.

13. A machine for continuously drawing sheets of glass of various thicknesses comprising a vat adapted to contain molten glass, a plurality of baits movable into the molten glass, a single annealing chamber for the plurality of sheets of glass, means for moving the baits vertically at different speeds to pull the sheets of glass up from the surface of the molten mass of glass, a plurality of spaced apart means engageable with the two edges of the sheets of glass to move them vertically when the said baits have been released from the glass, said engaging means contacting only with the edges of the sheets of glass in such a manner whereby distortions and injury to the body of glass are avoided and a plurality of polishing means arranged above the annealing chamber, substantially as set forth.

14. A machine for drawing sheets of glass of various thicknesses comprising a vat adapted to contain a mass of molten glass, a plurality of baits vertically movable into and out of the molten glass to cause the glass to adhere thereto and to be pulled up out of the mass of glass, a single annealing chamber for said sheets of glass, a plurality of spaced apart, vertically arranged movable conveyors positioned opposite each other within said chamber to engage the edges of the glass to move them upwardly after the baits have released the glass, and a plurality of resilient rollers engageable with the edges of the glass above the first named conveying means to guide the glass vertically to a position at which it may be cut into suitable lengths and a plurality of polishing means arranged above the annealing chamber, substantially as set forth.

15. In a glass making machine having a container for a body of molten glass, means for pulling a plurality of sheets of glass vertically from the surface of the molten glass and cooling means comprising a plurality of coils positioned adjacent the said sheets above the mass of glass, said sheets passing through an annealing chamber and a plurality of polishing means arranged above said annealing chamber, substantially as set forth.

In witness whereof, I have hereunto set my hand at Washington, District of Columbia, this eighth day of November, A. D. nineteen hundred and thirty.

EDMOND L. LE ROY.